United States Patent [19]

Kempka

[11] Patent Number: 5,649,257

[45] Date of Patent: Jul. 15, 1997

[54] TREE MOUNTED CAMERA SUPPORT

[76] Inventor: Scott A. Kempka, 1771 Badger St., Green Bay, Wis. 54303

[21] Appl. No.: 553,052

[22] Filed: Nov. 3, 1995

[51] Int. Cl.⁶ ............................................... G03B 29/00
[52] U.S. Cl. ................................................. 396/428
[58] Field of Search ................... 354/81, 293; 396/419, 396/427, 428

[56] References Cited

U.S. PATENT DOCUMENTS 4,439,032  3/1984  Congdon ........................... 354/293
5,497,214  3/1996  Labree .............................. 354/81

*Primary Examiner*—David M. Gray

[57] ABSTRACT

A tree mounted camera support comprised of a tree support portion comprised of a vertical portion, a horizontal portion and a diagonal support portion. The tree support portion has a pair of adjustable straps for securement to a trunk of a tree. An adjustable camera support is secured to a distal end of the horizontal portion of the tree support portion.

1 Claim, 3 Drawing Sheets

TREE MOUNTED CAMERA SUPPORT

BACKGROUND OF THE INVENTION

1. Field of the Invention

The present invention relates to a tree mounted camera support and more particularly pertains to strapping to a tree for supporting a highly adjustable camera support thereon with a tree mounted camera support.

2. Description of the Prior Art

The use of tree stands is known in the prior art. More specifically, tree stands heretofore devised and utilized for the purpose of supporting users at an elevated height on a tree are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,351,923 to Booth, Jr. discloses a portable camera support.

U.S. Pat. No. 5,316,105 to Reggin et al. discloses a portable tree stand for deer hunting.

U.S. Pat. No. Des. 348,215 to Melhorn discloses the ornamental design for a tree-mountable support.

U.S. Pat. No. 5,339,922 to Beechler discloses a tree stand for hunters.

U.S. Pat. No. 4,445,591 to Mitchell discloses a lightweight, portable hunter's tree stand.

U.S. Pat. No. 5,131,496 to White discloses a hunter's tree stand.

U.S. Pat. No. Des. 320,460 to Dubroc discloses the ornamental design for a hunter's tree seat.

While these devices fulfill their respective, particular objective and requirements, the aforementioned patents do not describe a tree mounted camera support for strapping to a tree for supporting a highly adjustable camera support thereon.

In this respect, the tree mounted camera support according to the present invention substantially departs from the conventional concepts and designs of the prior art, and in doing so provides an apparatus primarily developed for the purpose of strapping to a tree for supporting a highly adjustable camera support thereon.

Therefore, it can be appreciated that there exists a continuing need for new and improved tree mounted camera support which can be used for strapping to a tree for supporting a highly adjustable camera support thereon. In this regard, the present invention substantially fulfills this need.

SUMMARY OF THE INVENTION

In the view of the foregoing disadvantages inherent in the known types of tree stands now present in the prior art, the present invention provides an improved tree mounted camera support. As such, the general purpose of the present invention, which will be described subsequently in greater detail, is to provide a new and improved tree mounted camera support and method which has all the advantages of the prior art and none of the disadvantages.

To attain this, the present invention essentially comprises a tree support portion comprised of a vertical portion, a horizontal portion and a diagonal support portion. The horizontal portion extends outwardly from an upper portion of the vertical portion. The diagonal support portion extends from a lower portion of the vertical portion to an outer portion of the horizontal portion. The vertical portion has a pair of ring supports secured to the upper portion and the lower portion thereof. A pair of adjustable straps extend through the pair of ring supports for securement of the tree support portion to a trunk of a tree. The device includes an adjustable camera support comprising a shaft portion extending through a distal end of the horizontal portion of the tree support portion. An end portion of the shaft portion is adjustably received through a crank portion secured on the distal end of the horizontal portion. The crank portion has a crank handle for vertical adjustment of the shaft portion. A swivel mechanism is secured to the end portion of the shaft portion. The swivel mechanism has a handle extending outwardly therefrom for horizontal adjustment of the swivel mechanism. A camera mounting portion is secured to the swivel mechanism.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tree mounted camera support which has all the advantages of the prior art tree stands and none of the disadvantages.

It is another object of the present invention to provide a new and improved tree mounted camera support which may be easily and efficiently manufactured and marketed.

It is a further object of the present invention to provide a new and improved tree mounted camera support which is of durable and reliable construction.

An even further object of the present invention is to provide a new and improved tree mounted camera support which is susceptible of a low cost of manufacture with regard to both materials and labor, and which accordingly is then susceptible of low prices of sale to the consuming public, thereby making such a tree mounted camera support economically available to the buying public.

Still yet another object of the present invention is to provide a new and improved tree mounted camera support which provides in the apparatuses and methods of the prior art some of the advantages thereof, while simultaneously overcoming some of the disadvantages normally associated therewith.

Even still another object of the present invention is to provide a new and improved tree mounted camera support for strapping to a tree for supporting a highly adjustable camera support thereon.

Lastly, it is an object of the present invention to provide a new and improved tree mounted camera support comprised of a tree support portion comprised of a vertical portion, a horizontal portion and a diagonal support portion. The tree support portion has a pair of adjustable straps for securement to a trunk of a tree. An adjustable camera support is secured to a distal end of the horizontal portion of the tree support portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
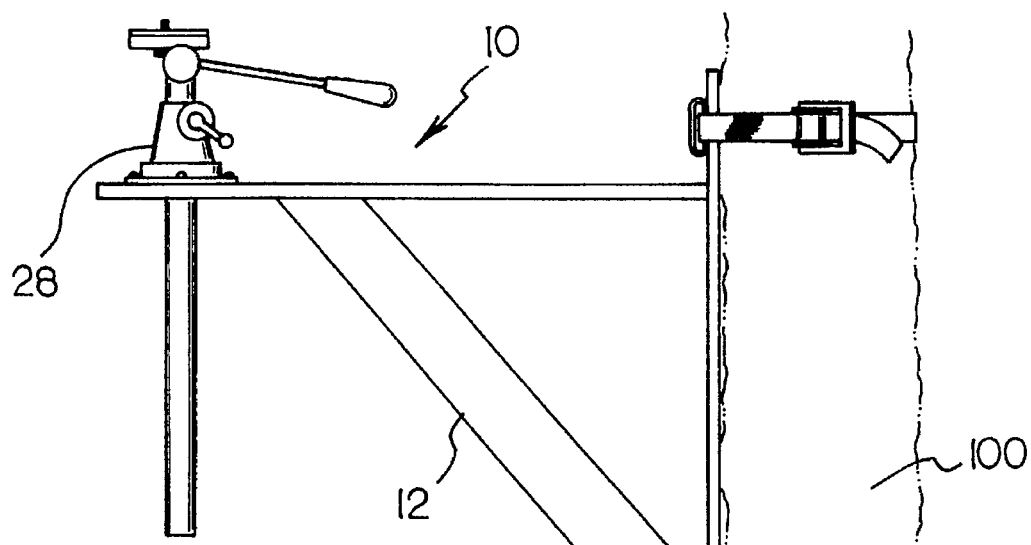
FIG. 1 is a side view of the preferred embodiment of the tree mounted camera support constructed in accordance with the principles of the present invention.
Figure 2:
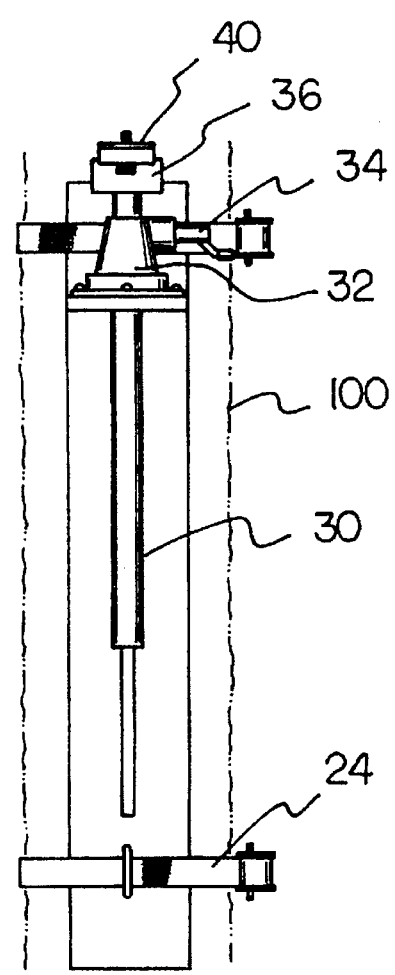
FIG. 2 is a front elevation view of the present invention.
Figure 3:
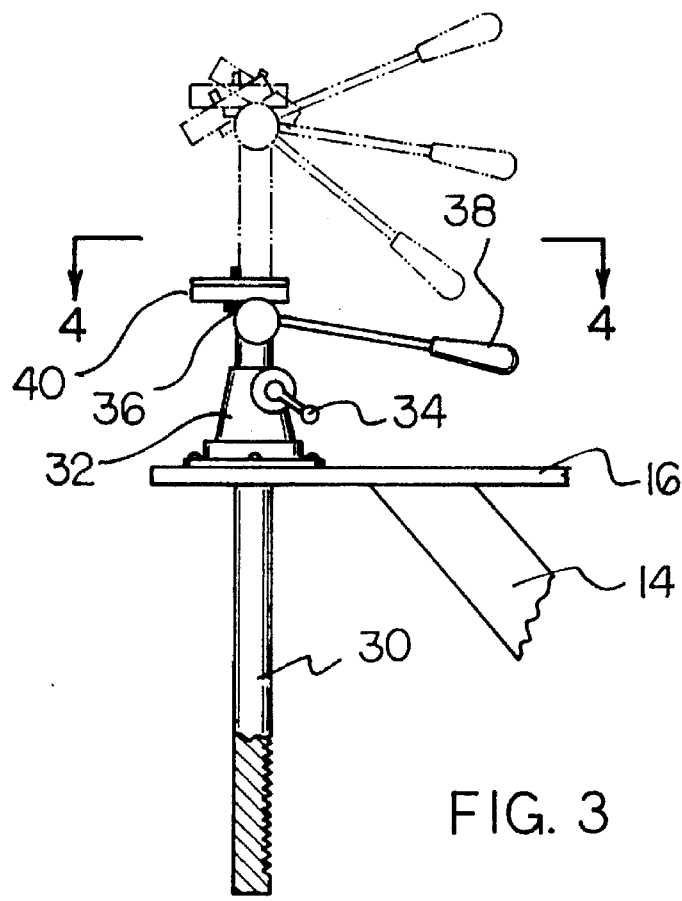
FIG. 3 is a partial side view of the present invention.
Figure 4:
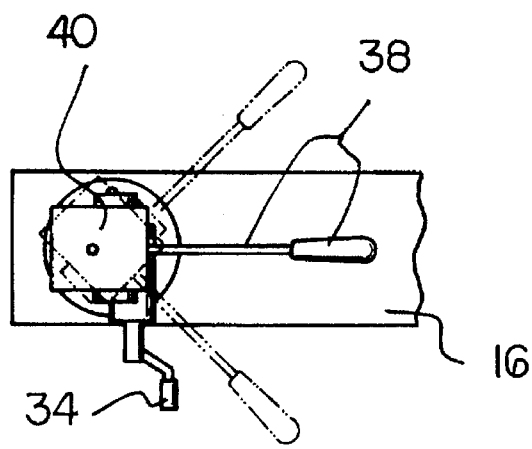
FIG. 4 is a cross-sectional view as taken along line 4—4 of FIG. 3.
Figure 5:
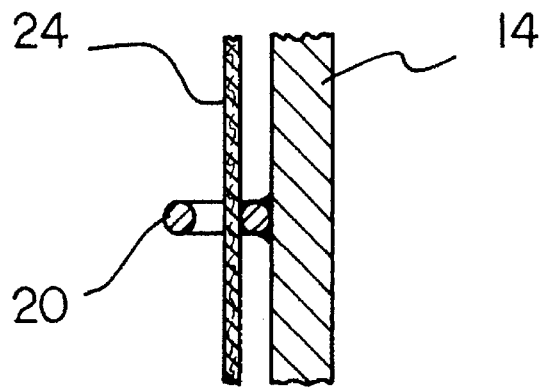
FIG. 5 is a cross-sectional view as taken along line 5—5 of FIG. 1.
Figure 6:
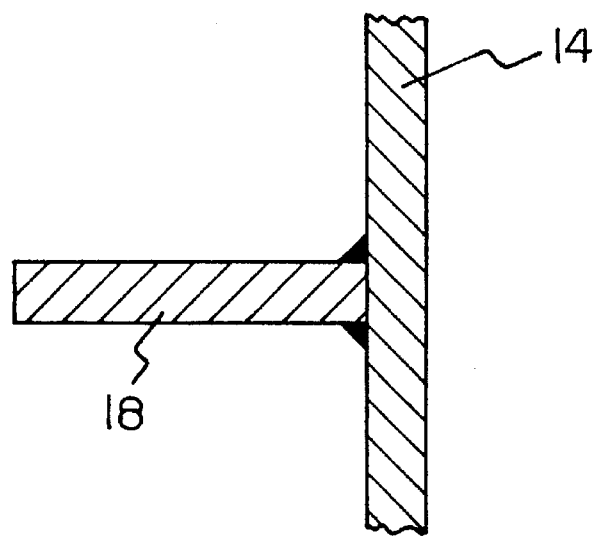
FIG. 6 is a cross-sectional view as taken along line 6—6 of FIG. 1.

With reference now to the drawings, and in particular, to FIGS. 1-6 thereof, the preferred embodiment of the new and improved tree mounted camera support embodying the principles and concepts of the present invention and generally designated by the reference number 10 will be described.

Specifically, it will be noted in the various Figures that the device relates to a new and improved tree mounted camera support for strapping to a tree for supporting a highly adjustable camera support thereon. In its broadest context, the device consists of a tree support portion, a pair of adjustable straps, and an adjustable camera support. Such components are individually configured and correlated with respect to each other so as to attain the desired objective.

The device 10 includes a tree support portion 12 comprised of a vertical portion 14, a horizontal portion 16 and a diagonal support portion 18. The horizontal portion 16 extends outwardly from an upper portion of the vertical portion 14. The diagonal support portion 18 extends from a lower portion of the vertical portion 14 to an outer portion of the horizontal portion 16. The tree support portion 12 has a generally triangular configuration. The vertical portion 14 has a length greater than the length of the diagonal support portion 18 and the diagonal support portion 18 has a length greater than the length of the horizontal portion 16. The vertical portion 14 has a pair of ring supports 20 secured to the upper portion and the lower portion thereof. The preferable construction of the tree support portion 12 is aluminum flat stock, two inches wide by ⅛ inch thick.

Next, a pair of adjustable straps 24 extend through the pair of ring supports 20 for securement of the tree support portion 12 to a trunk of a tree 100. The adjustable straps 24 allow for the device 10 to be secured to a variety of different sized trees.

Lastly, the device 10 includes an adjustable camera support 28 comprising a shaft portion 30 extending through a distal end of the horizontal portion 16 of the tree support portion 12. An end portion of the shaft portion 30 is adjustably received through a crank portion 32 secured on the distal end of the horizontal portion 16. The crank portion 32 has a crank handle 34 for vertical adjustment of the shaft portion 30. Simply by rotating the crank handle 34, a user can raise or lower the shaft portion 30 in relation to the horizontal portion 16. A swivel mechanism 36 is secured to the end portion of the shaft portion 30. The swivel mechanism 36 has a handle 38 extending outwardly therefrom for horizontal adjustment of the swivel mechanism 36. The handle 38 locks the swivel mechanism 36 in a stationary position or simply turning the handle 38 will unlock the swivel mechanism 36 to allow the swivel mechanism 36 to be rotated on a horizontal plane. A camera mounting portion 40 is secured to the swivel mechanism 36. The camera mounting portion 40 is adapted to receive a camera thereon. The camera is secured to the camera mounting portion 40 using its tripod attachment. The user then directs and focuses the camera on the location to be photographed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A tree mounted camera support for strapping to a tree for supporting a highly adjustable camera support thereon comprising, in combination:

a tree support portion comprised of a planar vertical portion, a horizontal portion and a diagonal support portion, the horizontal portion extending outwardly from an upper portion of the vertical portion, the diagonal support portion extending from a lower portion of the vertical portion to an outer portion of the horizontal portion, the vertical portion having a pair of ring supports secured to the upper portion and the lower portion thereof;

a pair of adjustable straps extending through the pair of ring supports for securement of the tree support portion to a trunk of a tree;

an adjustable camera support comprising a shaft portion extending through a distal end of the horizontal portion of the tree support portion, an end portion of the shaft portion adjustably received through a crank portion secured on the distal end of the horizontal portion, the crank portion having a crank handle for vertical adjustment of the shaft portion, the shaft portion having a plurality of teeth disposed thereon whereby rotation of the crank portion via the crank handle facilitates engagement with the plurality of teeth for raising or lowering of the shaft portion with respect to the tree support portion, a swivel mechanism secured to the end portion of the shaft portion, the swivel mechanism having a handle extending outwardly therefrom for horizontal adjustment of the swivel mechanism, a camera mounting portion secured to the swivel mechanism.

\* \* \* \* \*